Figure 1:
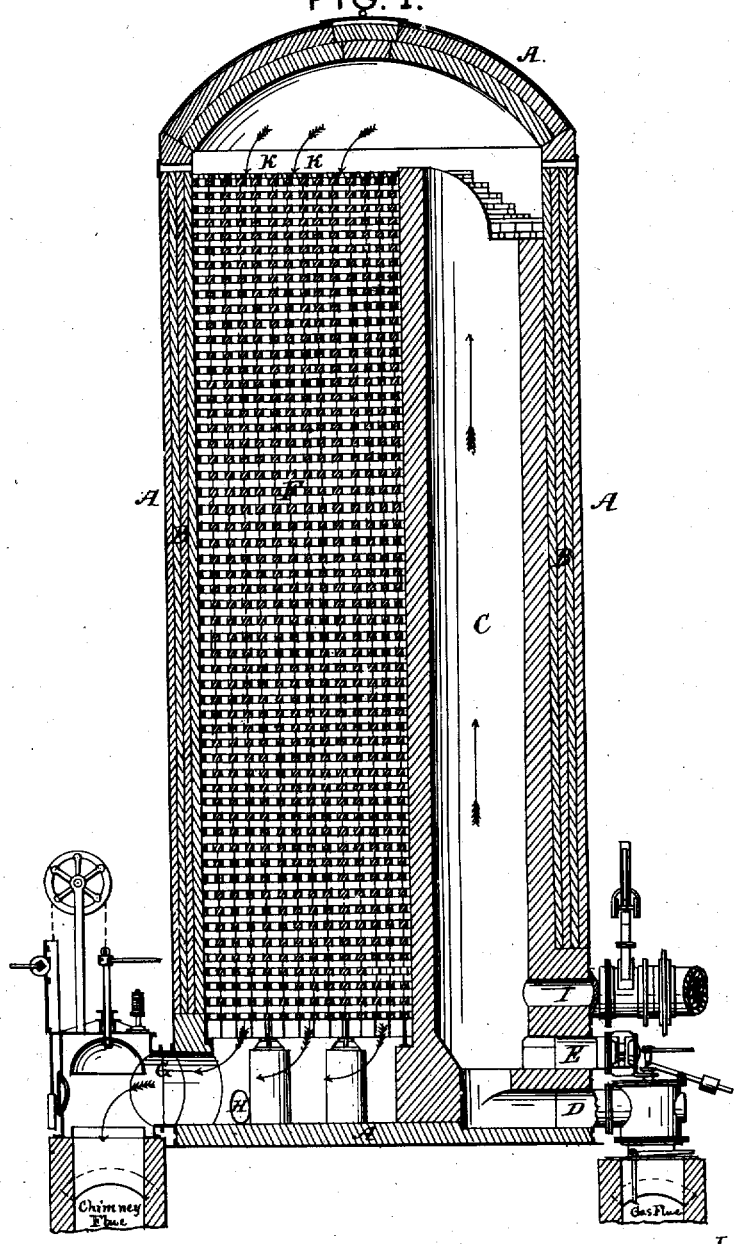

2 Sheets—Sheet 1.

C. COCHRANE & E. A. COWPER,

Assignors to C. W. SIEMENS.

Regenerative Hot-Blast Stove.

No. 8,814. Reissued July 22, 1879.

Witnesses:
Wm H Bates
Alex. Scott

Inventor:
C. Cochrane
E. A. Cowper by
Chas S Whitman Atty

C. COCHRANE & E. A. COWPER,

Assignors to C. W. SIEMENS.

Regenerative Hot-Blast Stove.

No. 8,814. Reissued July 22, 1879.

Witnesses;
Wm. H. Bates
Alex. Scott

Inventors
C. Cochrane
E. A. Cowper by
Chas. S. Whelman Atty

BEST AVAILABLE COPY

UNITED STATES PATENT OFFICE.

CHARLES COCHRANE, OF STOURBRIDGE, COUNTY OF WORCESTER, AND EDWARD A. COWPER, OF WESTMINSTER, COUNTY OF MIDDLESEX, ASSIGNORS TO CHARLES W. SIEMENS, OF WESTMINSTER, ENGLAND.

IMPROVEMENT IN REGENERATIVE HOT-BLAST STOVES.

Specification forming part of Letters Patent No. 167,644, dated September 14, 1875; Reissue No. 8,814, dated July 22, 1879; application filed March 28, 1879.

*To all whom it may concern:*

Be it known that we, CHARLES COCHRANE, of the Grange, Stourbridge, in the county of Worcester, England, and EDWARD ALFRED COWPER, of Westminster, in the county of Middlesex, England, have invented an Improvement in Regenerative Hot-Blast Stoves for heating air, steam, and other gases; and do hereby declare that the following description, taken in connection with the accompanying plates of drawings, hereinafter referred to, forms a full and exact specification of the same, wherein we have set forth the nature and principles of our said improvement, by which our invention may be distinguished from others of a similar class, together with such parts as we claim and desire to secure by Letters Patent—that is to say:

Our invention relates to that class of hot-blast stoves in which fire-brick surfaces are arranged to act as regenerators for absorbing and giving off heat; and the nature thereof consists in applying to such stoves means of distributing the volume of flame or products of combustion among the passages in the regenerator in a more perfect manner than heretofore, so that an equal, or nearly equal, quantity shall pass through each of the passages, and also that the cold air, on being passed through the heated regenerator, shall likewise be equally distributed and become uniformly heated, and thus give a higher temperature of blast than heretofore.

For this purpose we construct within the stove a vertical flue or uptake combustion-chamber, which we prefer to be circular in section, for the flame or products of combustion to ascend from the lower part of the stove to the upper part, and we place it close to one side of the stove or against the internal brick lining thereof, opposite to the chimney-valve. From the upper part of the stove the flame or products of combustion descend through the regenerative passages, and thus, the total length of passage through any part of the stove being nearly the same, the flame at the one time and the air at another time flows with equal freedom through any of these passages.

Our invention also consists in forming at or near the top of each of the regenerative passages contracted openings, narrowed apertures, or plates provided with holes, which reduces the area of inlet to such passage, and thereby prevents the flow through it of more than its due share, thus having the effect of dividing up the whole current and causing it to be distributed more uniformly among all the passages, whereby the action of the stove is rendered more perfect and the blast is heated to a higher temperature than formerly.

The contractions above described may be arranged so that there may be slightly-different areas through the passages, according to their position in the stove, the area being somewhat more contracted for passages which have less total depth.

The improvements above set forth are applicable also in stoves employed for heating gas, steam, or other aeriform liquids, as may be readily understood.

Figure 2:
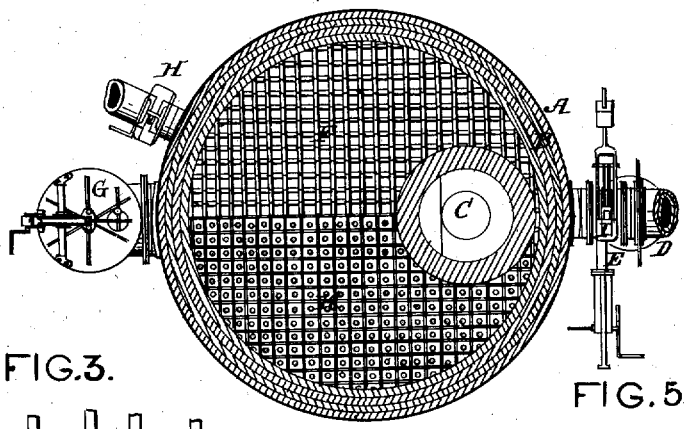

Figures 1 and 2 show, respectively, a vertical section and a sectional plan of one of a set of regenerative hot-blast stoves, in which A is the air-tight casing, of wrought-iron; B, the fire-brick lining; C, the vertical flue or uptake combustion-chamber. D is the gas-valve, through which gas for combustion is admitted. E is the air-valve for the admission of air for combustion. The flame produced by the combustion of the gas passes up the vertical flue C and down through the regenerator F and away to the chimney through the chimney-valve G, as indicated by the arrows.

When the stove is sufficiently heated the gas-valve D, the air-valve E, and the chimney-valve G are closed, and the cold-blast valve H being then opened, the blast passes through the regenerator F and down the vertical flue C, through the hot-blast valve I, to the blast-furnace, in the direction opposite to that indicated by the arrows.

From the above arrangement it will be seen that the currents that enter or leave that part of the regenerator F nearest the flue C at top have the farthest distance to travel at bottom to or from the chimney or cold-blast valves G and H, and vice versa, so that the total dis-

BEST AVAILABLE COPY tances traversed by the fluid currents passing through the stove are equal, or nearly so.

Figure 3:
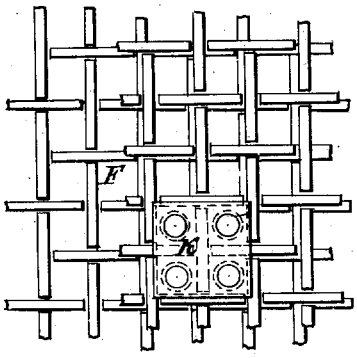
Figure 4:
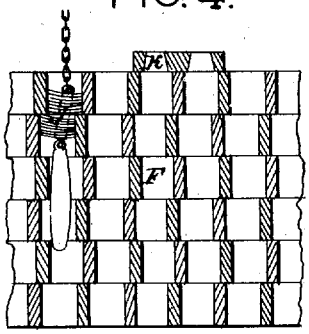

Fig. 3 is a plan, and Fig. 4 is a section, to an enlarged scale, of a portion of the regenerator F, which is formed of a number of fire-bricks placed at a distance apart, so as to form small passages through the mass. Over the top course of bricks tiles K K, with holes in them, are placed, to cause an equal flow of the products of combustion among all the passages, the holes being made smaller than the area of the passages, as shown. J is a brush for removing the dust from the passages.

Figure 5:
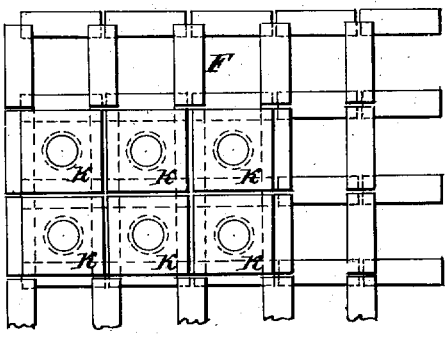
Figure 6:
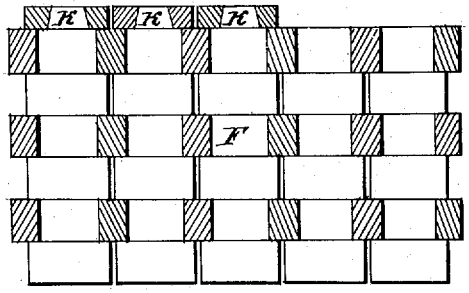

Fig. 5 is a plan, and Fig. 6 is a section, of another arrangement of bricks for the regenerator F. In this case the bricks are placed in lines crossing each other.

For clearing out any slight dust that may settle in the stove, it is convenient to blow it out by means of the blast put on at the time when there is a valve open to the outer air. A convenient mode of doing this is to provide a second gas-valve some distance back in the gas-main, and to open a door or valve between this gas-valve and that on the stove, so that the dust is blown out of the gas-passage.

We do not claim here the combination of a single uptake combustion-chamber with a regenerator when the same is connected with a further regenerative chamber, as such a construction is shown in an application of E. A. Cowper for United States Letters Patent.

Having thus described the nature of our invention, we claim—

1. In a hot-blast stove, the combination of a single uptake combustion-chamber, arranged on one side of the stove, and a regenerator, whereby a single regenerator can be equally heated.

2. A cylindrical regenerative hot-blast stove having a single uptake combustion-chamber at one side and an outlet on the other side for distributing the volume of flame or products of combustion among all the passages of the regenerator, as and for the purposes described.

3. The cylindrical regenerative hot-blast stove described, having a flue at one side and inlets and outlets on the other side, and plates K, with narrowed apertures, covering the regenerative passages, as and for the purposes described.

4. In regenerative hot-blast stoves with checker-work filling, the plates K, with apertures of smaller area than the passages of the checker-work.

In testimony that we claim the foregoing we have hereunto set our hands this 13th day of February, 1879.

CHARLES COCHRANE.
EDWARD ALFRED COWPER.

Witnesses as to signature of Charles Cochrane:

BROUGH SIMPSON,
FREDERICK F. ROBERTS,

Witnesses as to signature of Edward Alfred Cowper:

CHARLES EDWARD COWPER,
AMBROSE A. MYAH.